A. GUERNSEY.
CASTER.
APPLICATION FILED JULY 18, 1913.
1,121,494.
Patented Dec. 15, 1914.
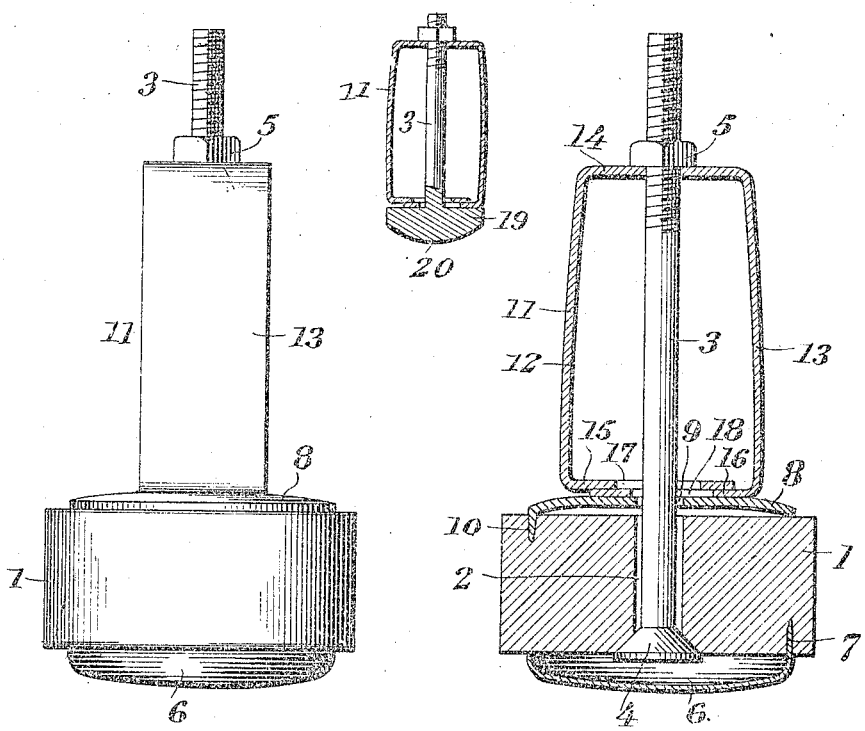
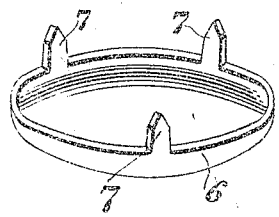
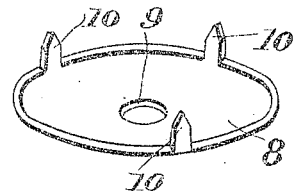
Inventor
Amelia Guernsey

UNITED STATES PATENT OFFICE.

AMELIA GUERNSEY, OF NORTH BAY, ONTARIO, CANADA.

CASTER.

1,121,494.　　　　　Specification of Letters Patent.　　Patented Dec. 15, 1914.

Application filed July 18, 1913. Serial No. 779,829.

*To all whom it may concern:*

Be it known that I, AMELIA GUERNSEY, a citizen of Canada, residing at North Bay, in the Province of Ontario and Dominion of Canada, have invented new and useful Improvements in Casters, of which the following is a specification.

This invention relates to casters and particularly to those of the gliding or sliding type, the object of the invention being to provide a caster of this character especially designed for use upon metallic beds, whereby wear and tear on floors and carpets or other floor coverings may be avoided and noise and strain diminished in moving the bed or other article from place to place.

A further object of the invention is to provide a caster which is simple of construction, inexpensive of production and efficient for its intended purpose.

The invention consists of the features of construction, combination and arrangement of parts hereinafter fully described and claimed, reference being had to the accompanying drawings, in which:—

Figure 1 is a side elevation of a sliding caster embodying my invention. Fig. 2 is a vertical section through the same. Fig. 3 is a perspective view of the bearing member. Fig. 4 is a similar view of the backing plate or washer. Fig. 5 is a view similar to Fig. 2 showing a modification.

In carrying my invention into practice I provide a caster comprising a body portion 1, preferably consisting of a circular disk of hard wood or other suitable material. This disk is provided with a central opening 2 through which extends a threaded bolt or stem 3 having at its lower end a head 4 bearing against the under side of the disk, the upper end of said bolt being threaded for the reception of a retaining and clamping nut 5.

Disposed upon the bottom of the disk is a substantially saucer-shaped bearing member 6, preferably stamped up from sheet metal, the convex surface of which faces downwardly for riding contact with the floor or other surface. The hollow side of the bearing member faces the disk and receives the head 4, and the rim edge of said bearing member is provided with spurs 7 which are driven into the wooden disk, thereby firmly holding said bearing member is position.

Engaging the upper surface of the bearing member is a backing plate or washer 8, having a central opening 9 for the passage of the threaded bolt or stem. This washer is struck up at intervals to provide peripheral spurs 10 which are driven into the upper surface of the wooden disk, whereby the disk and washer are held from relative movement.

Surrounding the threaded stem or bolt between the retaining nut and backing plate is an oblong rectangular spring frame 11 of a construction commonly employed, said frame being formed from a strip of spring metal providing opposing jaws 12 and 13 connected at their upper ends by an integral cross piece 14 and having lapping inwardly bent lower ends 15 and 16. The inwardly bent lower end of the jaw 12 is provided with an opening 17 for the passage of the bolt, which is of sufficient diameter to permit of its ready application and removal when required, while the inwardly bent end of the jaw 13 is formed with an elongated opening 18 of sufficient size to permit movement at all times of the jaw 13 toward and from the jaw 12, whereby a relative adjustment of said jaws is established for the desired spring clamping action against the walls of the receiving socket. By means of the nut 5 tie end 15 of the jaw 12 may be clamped with greater or less force against the clamping plate, thus regulating the degree of relative movement and spring clamping action of the jaws.

When the article is fitted in an obvious manner within the socket of the leg of the bedstead or other article of furniture, the bearing member and backing plate are held by the weight thereof firmly against any possibility of disconnection, while the body portion or disk 1 forms a finished surface which is exposed. It will be understood, of course, that as the bearing member 6 provides an absolutely smooth surface capable of sliding or gliding easily over a floor or floor covering, the bedstead or other article of furniture equipped with the improved casters may be moved from place to place without the wear and tear and strain caused by the use of ordinary wheel casters. It will further be understood that the invention provides a caster which is simple of construction, inexpensive of production and efficient for its intended purpose.

In the modified construction of my invention shown in Fig. 5, I dispense with the body portion 1, the bearing member 6, and the backing plate or washer 8, and provide the bolt or stem 3 with a bearing member or head 19 having a convex surface 20, which head is designed to perform the function of the member 6 disclosed in Figs. 1 to 4 inclusive. By this construction a simplified type of caster is produced which may be easily and economically manufactured.

I claim:—

A caster comprising a disk-shaped body having flattened top and bottom faces and an opening extending between said faces, a cup-shaped bearing member upon the lower face of the body, a resilient concavo-convex backing member upon the upper face of the body and having its convex side upwardly disposed, a stem projecting through the opening in the body and through said backing member and having a headed lower end inclosed within the cup-shaped body member, a nut in threaded engagement with the upper end of the stem, and a spring frame disposed between said backing member and nut, said frame comprising longitudinally extending spring jaws, a cross piece connecting the upper ends of the jaws and bearing against the nut, and through which the stem extends, and lapping arms extending inwardly from the lower ends of the jaws and arranged to seat against the convex surface of the backing member, said arms being substantially coextensive in length and having counterpart registering elongated slots through which the stem projects, whereby the arms are adapted to have like degrees of adjustment.

In testimony whereof I affix my signature in presence of two witnesses.

AMELIA GUERNSEY.

Witnesses:
HULDA KEATS,
ETHEL BROWNE.